United States Patent
Siluvainathan

(10) Patent No.: US 11,971,789 B2
(45) Date of Patent: Apr. 30, 2024

(54) SYSTEMS, METHODS, AND APPARATUS FOR CRASH RECOVERY IN STORAGE DEVICES

(71) Applicant: Samsung Electronics Co., Ltd., Suwon-si (KR)

(72) Inventor: Melky Arputharaja Siluvainathan, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 386 days.

(21) Appl. No.: 17/002,768

(22) Filed: Aug. 25, 2020

(65) Prior Publication Data

US 2021/0390022 A1 Dec. 16, 2021

Related U.S. Application Data

(60) Provisional application No. 63/039,976, filed on Jun. 16, 2020.

(51) Int. Cl.
*G06F 11/14* (2006.01)
*G06F 3/06* (2006.01)
*G06F 21/57* (2013.01)

(52) U.S. Cl.
CPC ........ *G06F 11/1471* (2013.01); *G06F 3/0607* (2013.01); *G06F 3/0658* (2013.01); *G06F 11/1441* (2013.01); *G06F 21/57* (2013.01); *G06F 3/0679* (2013.01)

(58) Field of Classification Search
CPC ............ G06F 11/1471; G06F 11/1441; G06F 3/0607; G06F 3/0658
See application file for complete search history.

(56) References Cited

U.S. PATENT DOCUMENTS

| 7,667,934 B1* | 2/2010 | Guarisco | G11B 5/40 360/313 |
| 9,229,870 B1* | 1/2016 | Kumar | G06F 12/0868 |
| 2002/0012341 A1* | 1/2002 | Battle | H04L 49/309 370/476 |
| 2003/0154421 A1* | 8/2003 | Abe | G06F 1/266 714/2 |
| 2010/0321071 A1* | 12/2010 | Sasaki | H03K 17/24 327/142 |

(Continued)

*Primary Examiner* — Jigar P Patel
(74) *Attorney, Agent, or Firm* — Renaissance IP Law Group LLP

(57) ABSTRACT

A method of operating a storage device may include establishing a connection between a host and the storage device, detecting a crash of the storage device, suspending, based on detecting the crash, processing commands from the host through the connection, recovering from the crash of the storage device, and resuming, based on recovering from the crash, processing commands from the host through the connection. The method may further include notifying the host of the crash based on detecting the crash of the storage device. Notifying the host may include sending an asynchronous event notification to the host through the connection. Notifying the host may include asserting a controller status indicator. The method may further include receiving a reset from the host, and resetting a storage interface based on receiving the reset from the host. The method may further include maintaining the connection through a communication interlace.

19 Claims, 6 Drawing Sheets

(56) References Cited

U.S. PATENT DOCUMENTS

| | | | |
|---|---|---|---|
| 2013/0080829 A1* | 3/2013 | Colline | G06F 11/076 |
| | | | 714/E11.062 |
| 2015/0254088 A1 | 9/2015 | Chou et al. | |
| 2016/0224405 A1* | 8/2016 | Bohn | G06F 11/0793 |
| 2017/0255535 A1* | 9/2017 | Freeman | G06F 11/349 |
| 2018/0095681 A1* | 4/2018 | Swanson | G06F 3/0688 |
| 2019/0041938 A1 | 2/2019 | Zupanc et al. | |
| 2019/0155765 A1 | 5/2019 | Lee et al. | |
| 2019/0317891 A1 | 10/2019 | Nalli et al. | |
| 2019/0340058 A1 | 11/2019 | Sasidharan et al. | |

* cited by examiner

US 11,971,789 B2

SYSTEMS, METHODS, AND APPARATUS FOR CRASH RECOVERY IN STORAGE DEVICES

CROSS-REFERENCE TO RELATED APPLICATIONS

This application claims priority to, and the benefit of, U.S. Provisional Patent Application Ser. No. 63/039,976 titled "Systems, Methods, and Apparatus For Crash Recovery in Storage Devices" filed Jun. 16, 2020 which is incorporated by reference.

TECHNICAL FIELD

This disclosure relates generally to storage devices, and more specifically to systems, methods, and apparatus for crash recovery in storage devices.

BACKGROUND

A storage device may experience a crash (device failure) event during operation. The storage device may perform a crash recovery process after experiencing a crash event.

The above information disclosed in this Background section is only for enhancement of understanding of the background of the invention and therefore it may contain information that does not constitute prior art.

SUMMARY

A method of operating a storage device may include establishing a connection between a host and the storage device, detecting a crash of the storage device, suspending, based on detecting the crash, processing commands from the host through the connection, recovering from the crash of the storage device, and resuming, based on recovering from the crash, processing commands from the host through the connection. The method may further include notifying the host of the crash based on detecting the crash of the storage device. Notifying the host may include sending an asynchronous event notification to the host through the connection. Notifying the host may include asserting a controller status indicator. The controller status indicator may be a controller fatal status indicator. The method may further include receiving a reset from the host, and resetting a storage interface based on receiving the reset from the host. The reset may include a controller reset, and resetting the storage interface may include resetting a controller in the storage interface. The reset may include resetting read command processing hardware and/or write command processing hardware. The method may further include maintaining the connection through a communication interface. Recovering from the crash may include enabling a host reset of the communication interface. Recovering from the crash of the storage device may include partially restarting one or more processors in the storage device. recovering from the crash of the storage device may further include storing crash dump data using one or more partially reset processors. Recovering from the crash of the storage device may further include resetting a storage media module, and storing the crash dump data in the storage media module. Recovering from the crash of the storage device may include reloading firmware for one or more processors of the storage device. Recovering from the crash of the storage device may include masking one or more events.

A storage device may include a storage media module, a communication interface arranged to provide a connection between the storage device and a host, and recovery logic configured to perform a crash recovery process based on detecting a crash of the storage device, and maintain the connection based on the crash recovery process. The storage device may further include a storage interface coupled between the communication interface and the storage media module. The storage interface may be configured to reset based on a reset event from the host. The reset event may include a reset command received from the host through the connection. The recovery logic may be further configured to notify the host of the crash of the storage device.

A method may include maintaining a connection between a storage device and a host through a communication interface, detecting a crash at the storage device, notifying the host of the crash through the connection, and restarting one or more components of the storage device based on detecting the crash. The method may further include partially restarting a processor in the storage device, and saving crash dump data using the processor. Restarting one or more components may include resetting a storage interface based on a reset event from the host. The reset event may include a reset command received from the host through the connection.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

In some embodiments, a storage device may maintain a connection with a host during a crash recovery process. This may enable the storage device to continue operating after recovery, thereby reducing or preventing service interruptions.

This disclosure encompasses numerous inventive principles that may enable a storage device to maintain a connection with a host during a crash recovery process. Some of these principles relate to techniques for selectively resetting or reinitializing hardware and/or software components of a storage device. For example, in some embodiments, one or more components such as a storage media module and/or a translation layer may be reset during a crash recovery process, whereas one or more other components such as a communication interface to the host may not be reset during the crash recovery process. As another example, in some embodiments, one or more components such as a storage interface may not be reset during an initial portion of a recovery process, but may be reset in response to a reset event from the host. As yet another example, in some embodiments, a memory used to store configuration information provided by the host may not be reset during a crash recovery and/or may be reset in response to a reset event from the host. As a further example, in some embodiments, one or more processors in the storage device may be partially restarted (e.g., only to the extent needed) to reduce the time for performing a crash dump save.

Some additional principles of this disclosure relate to techniques for notifying a host of a storage device crash. For example, in some embodiments, a storage device may send an asynchronous notification to a host using, for example, a storage protocol. As another example, in some embodiments, a host may be notified of a storage device crash through a status register that may be accessed by the host.

These and other principles disclosed herein may have independent utility and may be embodied individually, and not every embodiment may utilize every principle. Moreover, the principles may also be embodied in various combinations, some of which may amplify the benefits of the individual principles in a synergistic manner.

Figure 1:
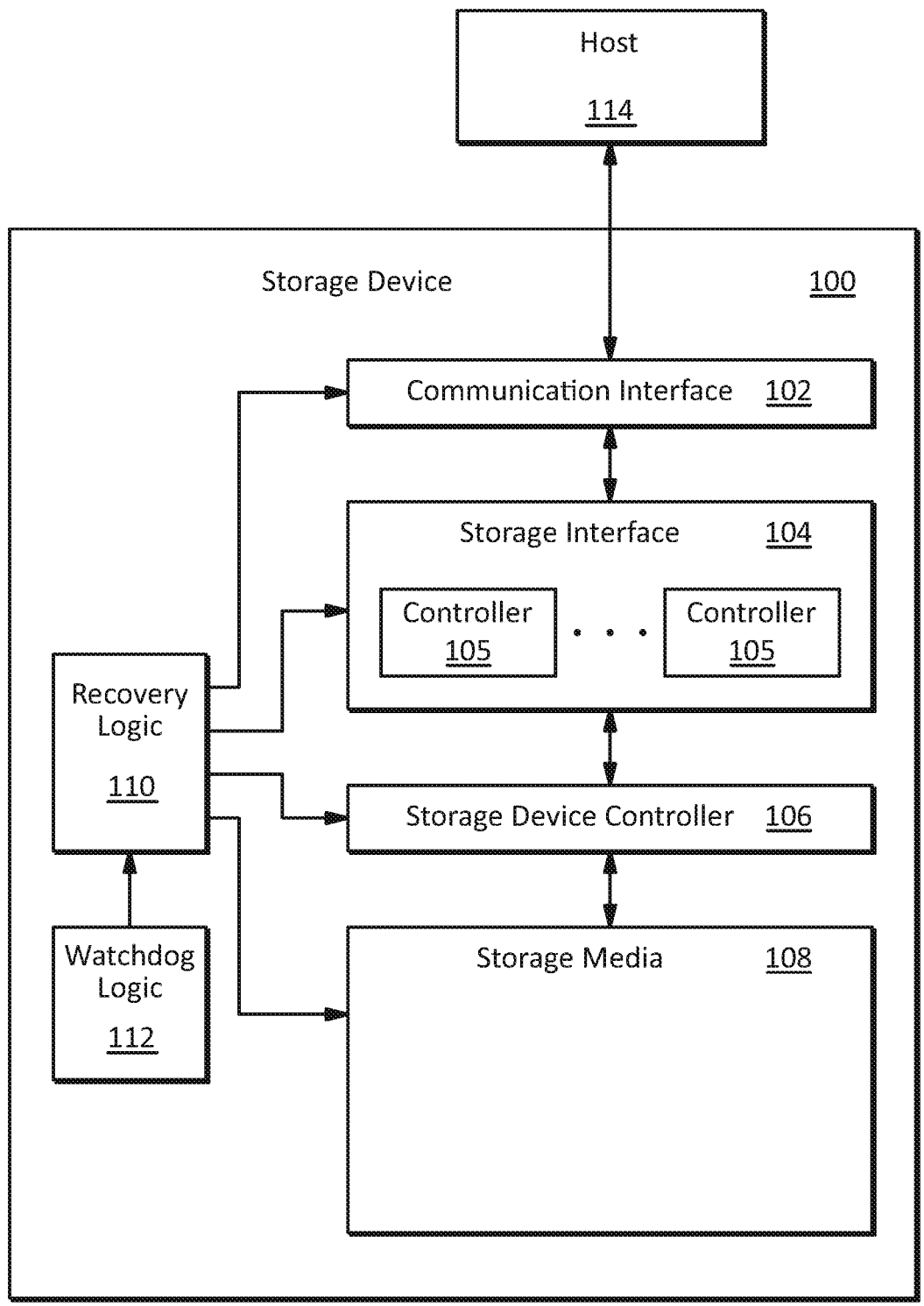
FIG. 1 illustrates an embodiment of storage device that may maintain a connection with a host during a crash recovery process according to this disclosure.

FIG. 1 illustrates an embodiment of storage device that may maintain a connection with a host during a crash recovery process according to this disclosure. The storage device 100 may include a communication interface 102, a storage interface 104, a storage device controller 106, a storage media module 108, crash recovery logic 110, and watchdog logic 112. The communication interface 102, which may provide a connection with a host 114, may be implemented with an interconnect interface such as Peripheral Component Interconnect Express (PCIe), a network interface such as Ethernet, InfiniBand, Fibre Channel, and/or the like. In some embodiments, the communication interface 102 may include circuitry such as one or more transmitters, receivers, buffers, and/or the like to establish one or more communication channels with the host 114. The storage interface 104 may be implemented, for example, with Nonvolatile Memory Express (NVMe) or any other storage interface and may include one or more controllers 105.

The storage device controller 106 may include various components to control the overall operation of the storage device 100 such as a flash translation layer (FTL) which may control access to storage media in the storage media module 108. The storage media module 108 may be implemented with a solid state storage media such as not-AND (NAND) flash memory, or any other type of solid state storage media, magnetic media, optical media, and/or the like.

The recovery logic 110 may include functionality to control a crash recovery process in the storage device 100. The watchdog logic 112 may include functionality to detect a crash of the storage device which may be caused, for example, by software and/or firmware errors, hardware faults, code corruption, data corruption, and/or the like.

The communication interface 102, storage interface 104, storage device controller 106, crash recovery logic 110, and watchdog logic 112 may be implemented with hardware, software, or any combination thereof. For example, in some embodiments, any of these components may include circuitry such as combinational logic, sequential logic, one or more timers, counters, registers, state machines, volatile memory such as dynamic random access memory (DRAM) and/or static dynamic access memory (SRAM), nonvolatile memory such as flash memory, complex programmable logic devices (CPLDs), field programmable gate arrays (FPGAs), application specific integrated circuits (ASICs), complex instruction set computer (CISC) and/or reduced instruction set computer (RISC) processors executing instructions, and/or the like, to perform their respective functions. Although illustrated as individual components, in some embodiments, some components shown separately in FIG. 1 may be integrated into single components, and/or some components shown as single components may be implemented with multiple components. For example, the recovery logic 110 may be integrated into the storage device controller 106.

During normal operation, the storage device 100 may process administrative and/or input/output (I/O) commands received from the host 114 through a connection that may be established with the host 114 through the communication interface 102 and storage interface 104. Examples of administrative and/or I/O commands may include read and/or write commands that may be used, for example, by the storage interface 104.

In some embodiments, a connection between the host 114 and storage device 100 may involve attention from the storage device at specific times. For example, the host 114 may expect the communication interface 102 to respond to one or more commands that may be defined by the communication interface protocol. If the communication interface 102 fails to respond within a predetermined period of time, the host 114 may detect a timeout condition that may cause the host 114 to determine that it has lost the connection with the storage device 100. Similarly, if the storage interface 104 fails to respond to the host 114 within a predetermined period of time, the host 114 may detect a timeout condition that may cause the host 114 to determine that it has lost the connection with the storage device 100. As another example, if the storage device 100 fails to process administrative and/or I/O commands from the host 114 for a predetermined period of time, the host 114 may detect a timeout condition that may cause the host 114 to determine that the storage device 100 has failed.

In some embodiments, any of these timeout conditions may cause the host to consider the storage device to be offline. This may result in a service interruption because the data stored in the storage device may become unavailable and/or the functionality of the storage device may not be accessed when it is offline.

In some embodiments, however, recovering from a crash may involve processes that may last long enough to cause one or more timeout conditions. For example, when a crash occurs, a storage device may collect crash dump data on a failure event and/or associated data and save it in nonvolatile memory for analysis at a later time. Analyzing the crash dump data may enable a manufacture to identify the cause of a crash and prevent future crashes by, for example, updating firmware in the storage device. As another example, a storage device may reset or reinitialize one or more components in response to detecting a crash. However, if the storage device is nonresponsive to a host during one or more crash recovery processes such as collecting and saving crash dump data and/or resetting or reinitializing components, the host may determine that a timeout condition has occurred.

To prevent a timeout condition, and a service interruption that may potentially result from a timeout, some embodiments according to this disclosure may maintain a connection with a host during a crash recovery process. For example, in the storage device 100 illustrated in FIG. 1, the recovery logic 110 may implement a crash recovery process that may enable the storage device 100 to maintain a connection with a host 114, while the storage device 100 performs one or more crash recovery tasks such as collecting and saving crash dump data, resetting or reinitializing various components of the storage device 100, notifying the host 114 of a crash and/or error condition, suspending and/or resuming the processing of commands from the host 114, and/or the like. In some embodiments, the storage device 100 may implement one or more of the techniques disclosed herein to maintain a connection with a host during a crash recovery process. In some embodiments, the storage device 100 may implement a crash recovery process, for example, as described in FIG. 2.

Figure 2:
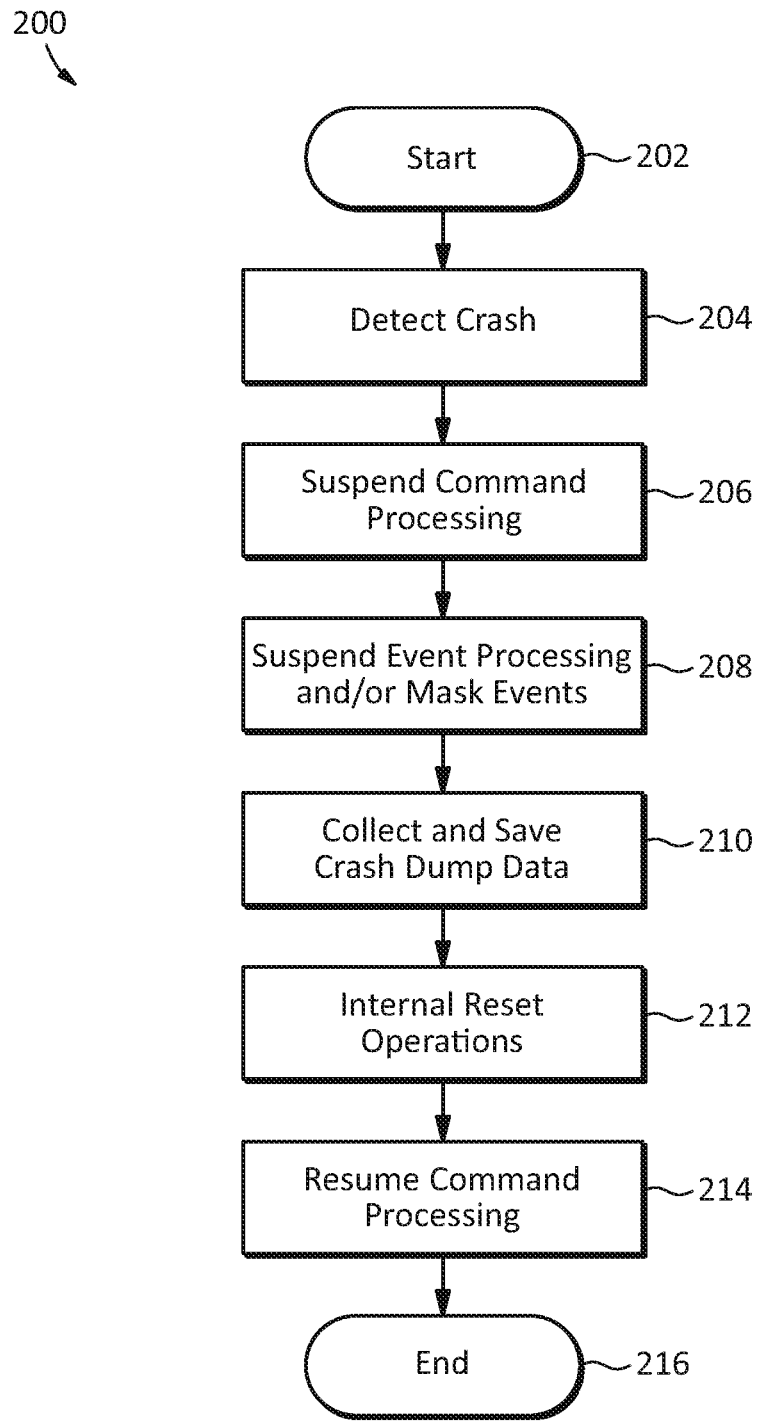
FIG. 2 illustrates an embodiment of a crash recovery method that may enable a storage device to maintain a connection with a host according to this disclosure.

FIG. 2 illustrates an embodiment of a crash recovery method that may enable a storage device to maintain a connection with a host according to this disclosure. The method illustrated in FIG. 2 may be described in the context of the storage device 100 illustrated FIG. 1, however, the method illustrated in FIG. 2 is not limited to the details illustrated in FIG. 1.

Referring to FIG. 2, the method 200 may begin at operation 202, where the storage device 100 may be processing administrative and/or I/O commands received from the host 114 through a connection that may have been established with the host 114 through the communication interface 102 and storage interface 104. At operation 204, the watchdog logic 112 may detect a crash of the storage device 100. At operation 206, in response to detecting a crash, a recovery process may begin, for example, under control of the recovery logic 110. The recovery process may begin with the storage device controller 106 suspending processing of commands from the host 114, for example, to prevent new commands from polluting debug data that may be used to debug the cause of the crash. In some implementations, at operation 208, event processing may be suspended and/or events such as internal and/or host events may be masked, for example, to prevent events from interfering with the recovery process.

At operation 210, crash dump data may be collected and saved for future analysis. In some implementations, this may involve one or more actions such as resetting the storage media module 108, resetting a translation layer in the storage device controller, and/or resetting one or more CPUs in the storage device controller 106. In some implementations, the one or more CPUs may be partially restarted (e.g., only to the extent needed to collect and save crash dump data) to reduce the amount of time involved in performing operation 210. For example, during a normal restart, one or more of the CPUs may initialize hardware and/or software for a range of functions such as I/O operations, memory access operations, and/or the like. However, during a partial restart, a CPU may only initialize one or more memory interfaces to enable the CPU to collect and store crash dump data. In some operations, reducing the amount of time involved in performing operation 210 may enable the recovery process to be completed before the host may determine that one or more timeout conditions has occurred, e.g., a timeout of an administrative and/or I/O command.

At operation 212, one or more internal hardware and/or software reset operations may be performed. This may include, for example, reloading firmware and/or performing a full restart on one or more CPUs in the storage device controller 106, for example, to recover from any code and/or data corruption. In some implementations, one or more internal hardware and/or software reset operations may clean up pending commands in the storage device 100.

Prior to operation 212, the communication interface 102 and/or storage interface 104 may have been maintained in one or more states that may maintain the connection between the host 114 and the storage device 100. For example, no reset operations may have been performed on the communication interface 102 or storage interface 104. Alternatively, only a fast or partial reset may have been performed on the communication interface 102 and/or the storage interface 104 in a manner that may maintain the connection with the host 114.

At operation 212, however, in some implementations, a full or partial reset may be performed on one or both of the communication interface 102 and/or the storage interface 104. Such a reset may be performed, for example, in a manner that may be coordinated with the host 114 such that the host 114 may not determine that it has lost the connection with the storage device 100. For example, the storage interface 104 may notify the host 114 of a fatal error condition that may prompt the host 114 to issue a reset command for the storage interface 104. In some embodiments, a reset of the storage interface 104 may include resetting one or more controllers 105. In some embodiments, a full or partial reset may involve resetting read command processing hardware and/or write command processing hardware. Such read and/or write command processing hardware may be included, for example, in the storage interface 104 and/or the storage device controller 106.

At operation 214, the storage device controller 106 may resume processing of commands from the host 114 using the same connection that was being used before the crash was detected. In some implementations, internal and/or host events may be unmasked at operation 214.

In some implementations, one or more additional operations may be performed to prevent the host from determining that a timeout has occurred. For example, at operation 206, the storage device 100 may notify the host 114 that a crash has been detected. The host 104 may be notified for example, by sending an asynchronous notification which may be defined, for example, by a protocol for the storage interface 104.

At operation 216, the crash recovery process may terminate, and the storage device 100 may continue processing commands from the host 114.

The operations and/or components described with respect to the embodiment illustrated in FIGS. 1 and 2, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

Figure 3:
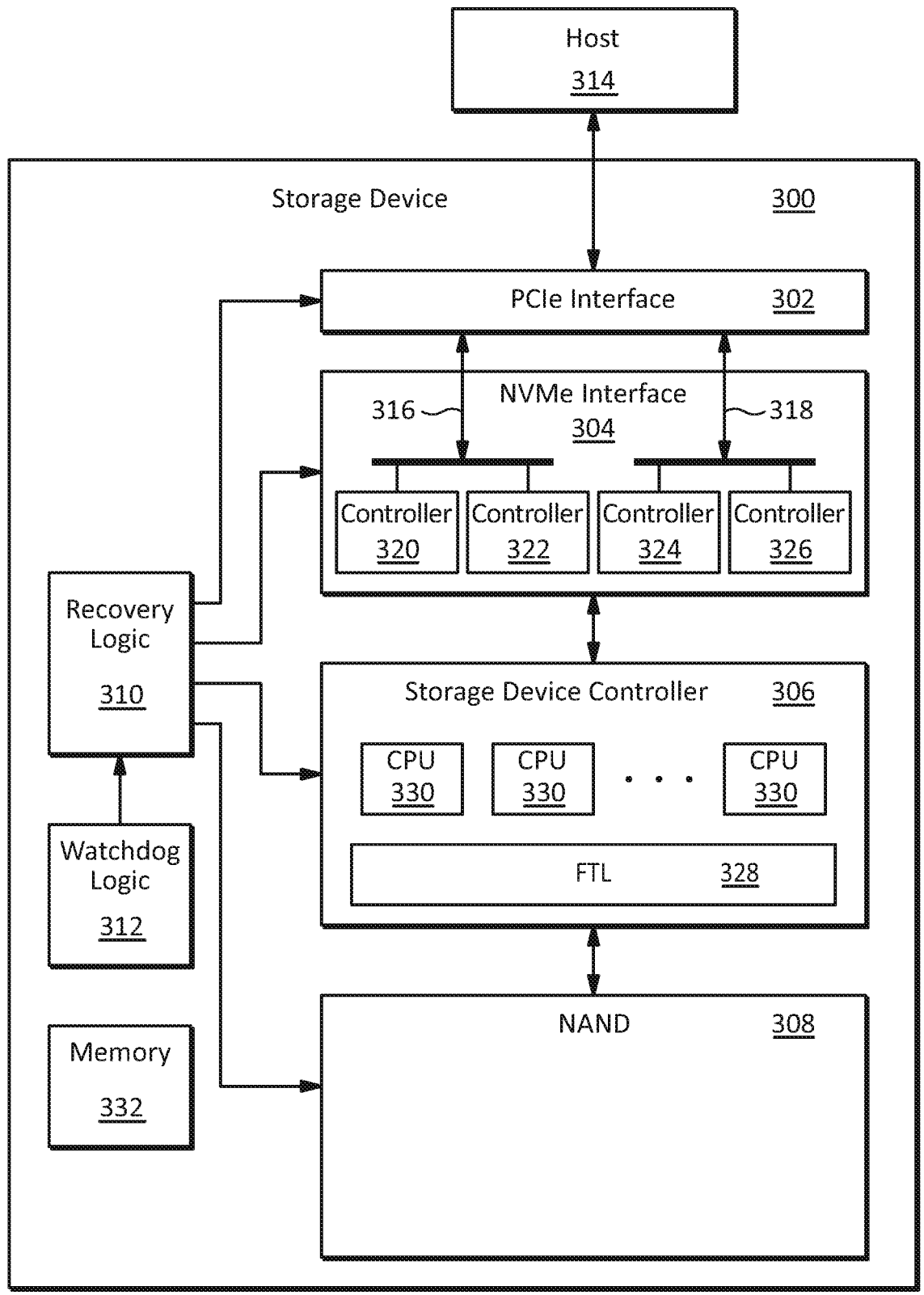
FIG. 3 illustrates an example embodiment of storage device that may maintain a connection with a host during a crash recovery process according to this disclosure.
Figure 4:
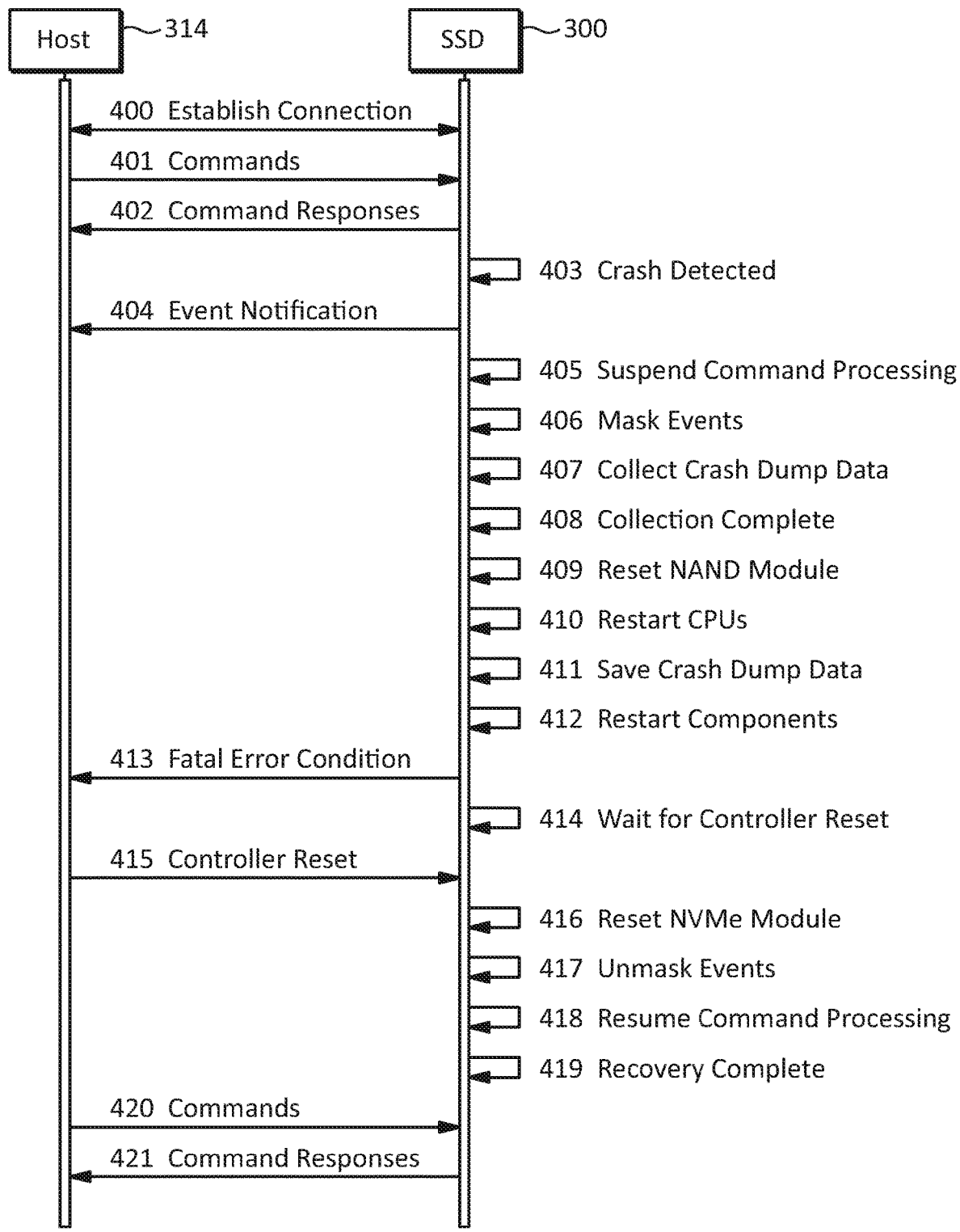
FIG. 4 illustrates a sequence diagram for an example embodiment of a crash recovery process according to this disclosure.

FIG. 3 illustrates an example embodiment of storage device that may maintain a connection with a host during a crash recovery process according to this disclosure. FIG. 4 illustrates a sequence diagram for an example embodiment of a crash recovery process according to this disclosure. The storage device illustrated in FIG. 3 and the crash recovery process illustrated in FIG. 4 may be used in conjunction with each other, but neither is limited to the specific details of the other.

For purposes of illustration, the embodiments illustrated in FIGS. 3 and 4 may be described in the context of certain implementation details such as a storage interface implemented with NVMe, which may use an underlying communication interface implemented with PCIe. As another example, the storage device may be implemented as a solid state drive (SSD) having a storage media module implemented with NAND flash memory. However, the principles are not limited to these details and may be implemented in any other manner.

Referring to FIG. 3, the storage device 300 may include a PCIe interface 302, an NVMe interface 304, a storage device controller 306, a NAND module 308, crash recovery logic 310, watchdog logic 312, and a common memory 332. The PCIe interface 302 may provide one or more connections with one or more hosts 314 (which may be referred to as the host 314). In some embodiments, the PCIe interface 302 may include circuitry such as one or more transmitters, receivers, buffers, and/or the like to establish the connections with the host 314. In the embodiment illustrated in FIG. 3, the NVMe interface 304 may include a first port 316 having two controllers 320 and 322. The NVMe interface 304 may also include a second port 318 having two controllers 324 and 326. In other embodiments, the NVMe interface 304 may have any number of ports, connections, and/or controllers. The controllers may be allocated, for example, such that each controller is associated with a virtual machine (VM) at the host 314. In some embodiments in which the host 314 may enable single root I/O virtualization (SR-IOV), each PCIe port may have a physical function and one or more virtual functions, and one controller may be associated with each physical and virtual function. The NVMe interface 304 may perform NVMe I/O command processing which may involve tasks such as fetching physical region pages (PRPs) which may contain physical memory page address that define physical memory pages, fetching data from the host 314 and sending it to the controllers 320, 322, 324, and 326, and/or the like.

The storage device controller 306 may include an FTL 328 which may, for example, perform logical-to-physical mapping of the NAND module 308. The storage device controller 306 may also include one or more CPUs 330 to implement various controller functions. In some embodiments, one or more of the CPUs 330 may function as a management processor that may control the overall operation of the storage device 300.

The recovery logic 310 may include functionality to control a crash recovery process in the storage device 300 in response to a crash which may be detected by the watchdog logic 312. For example, the recovery logic 310 may control the timing, type, and/or level of resets applied to any of the components of the storage device 300. The recovery logic 310 may also control crash dump data collection and/or saving operations, sending one or more notifications to the host 314, masking and/or unmasking of events, suspension and/or resumption of command processing, and/or the like.

In some embodiments, the common memory 332 may be implemented with volatile memory such as DRAM that may be accessible to some or all of the components of the storage device 300. The common memory 332 may be used, for example, by one or more CPUs 330 and/or the FTL to store crash dump data during a recovery process prior to transferring the crash dump data to the NAND module 308.

The PCIe interface 302, NVMe interface 304, storage device controller 306, crash recovery logic 310, and watchdog logic 312 may be implemented with hardware, software, or any combination thereof. For example, in some embodiments, any of these components may include circuitry such as combinational logic, sequential logic, one or more timers, counters, registers, state machines, volatile memory such as DRAM and/or SRAM, nonvolatile memory such as flash memory, CPLDs, FPGAs, ASICs, CISC and/or RISC processors executing instructions, and/or the like, to perform their respective functions. Although illustrated as individual components, in some embodiments, some components shown separately in FIG. 3 may be integrated into single components, and/or some components shown as single components may be implemented with multiple components. For example, the recovery logic 310 and/or common memory 332 may be integrated into the storage device controller 306. As another example, the FTL 328 may be implemented separately from the storage device controller 306.

Referring to FIG. 4, the embodiment of a crash recovery process may be described in the context of a host 314 and a storage device 300 implemented as a NVMe SSD, but in other embodiments, other types, numbers, and/or arrangements of devices may be used.

The embodiment illustrated in FIG. 4 may begin at operation 400 where a connection is established between the host 314 and the storage device 300. The connection may be established, for example, at both the PCIe level and the NVMe level. In some embodiments, configuration data provided by the host 314 may be stored, for example, in memory such as SRAM or DRAM in the NVMe interface 304.

At operation 401, one or more administrative and/or I/O commands may be received by the storage device 300. In some embodiments, one or more of the commands may be saved in one or more submission queues which may be located at the host 314, the storage device 300, and/or combinations thereof. The storage device 300 may fetch commands from the one or more submission queues and process them accordingly. In some embodiments, the storage device may implement a command arbitration such as round robin arbitration, urgent priority arbitration, and/or the like. At operation 402, the storage device 300 may provide one or more command responses to the host 314, for example, by placing an entry in a completion queue, which may be located at the host 314, the storage device 300, and/or combinations thereof.

At operation 403, the watchdog logic 312 may detect a crash of the storage device 300. The crash may be caused by any source of failure such as software and/or firmware errors, hardware faults, code corruption, data corruption, and/or the like. The detection of a crash may cause the recovery logic 310 to initiate a crash recovery process which may proceed as described below. However in some embodiments, the order of the operations may be different, some operations may be omitted, and other operations may be included. In the embodiment of the storage device 300 illustrated in FIG. 3 and the crash recovery process illustrated in FIG. 4, the recovery logic 310 may be implemented by a management processor such as one or the CPUs 330 in the storage device controller 306. In other embodiments, however, the recovery logic 310 may be implemented with a separate processor, with dedicated hardware, and/or the like.

At operation 404, the storage device 300 may notify the host 314 that a crash event has occurred. Some crash events may prevent the storage device 300 and host 314 from communicating through one or more queues. In some embodiments, the storage device 300 may notify the host 314 that a crash has occurred, for example, by sending one or more asynchronous event notifications to the host 314 through the NVMe interface 304. In some embodiments, one or more VMs at the host 314 may receive asynchronous event notifications. For example, one or more of the controllers 320, 322, 324, and/or 326 may each send an asynchronous event notification to a corresponding VM at the host 314. In some embodiments, an asynchronous event notification may be implemented as a completion of a command sent by the host 314. For example, the host 314 may send an asynchronous event request command, which may not have a timeout, to the device 300. The device 300 may keep the asynchronous event request command and not respond to it until the device has an event to communicate to the host 314. The device 300 may then respond by sending a completion to the host 314 including a notification of a crash event.

At operation 405, the storage device 300 may suspend fetching and/or processing commands. This may be implemented, for example, by disabling command arbitration on one or more of the controllers 320, 322, 324, and/or 326.

In some embodiments, the host 314 may issue events such as controller enable, controller shutdown, controller reset, and/or the like, through an NVMe register space that is accessible to one or more of the NVMe controllers 320, 322, 324, and/or 326.

At operation 406, a management processor implementing the recovery logic 310 may instruct one or more controllers in the PCIe interface 302 and/or the NVMe interface 304 to selectively mask internal and/or host events to prevent new events from interfering with the recovery process. For example, in some embodiments, PCIe and/or NVMe events that may be involved in maintaining the connection with the host 314 (e.g., port-level resets, function-level resets, control transactions, memory transactions, and/or the like) may remain unmasked. Thus, in some embodiments, the PCIe interface 302 may continue to process PCIe resets during a crash recovery process, and/or the host 314 may be able to access a controller register space for the one or more controllers 320, 322, 324, and/or 326. In some embodiments, one or more NVMe events may be masked, for example, because they may be configured to have relatively long timeout periods. In some embodiments, other events may be masked, for example, if they may take up time during the crash recovery process and/or if they may have timing aspects that may not cause a fatal error if masked. In some embodiments, events that are masked may be saved for later execution after the recovery process is completed and the events are unmasked.

At operation 407, a management processor implementing the recovery logic 310 may instruct one or more of the CPUs 330 to collect crash dump data The crash dump data may provide, for example, a memory snapshot of the state of the storage device at the time of the crash. Each of the CPUs 330, as well as one or more CPUs in the FTL 328 may collect its own data using, for example, global direct memory access (GDMA) hardware. In some implementations, each CPU may designate a number of bytes for the GDMA to save and a destination for the data. The crash dump data may be temporarily stored, for example, in the common memory 332 which may be implemented as DRAM.

At operation 408, a management processor implementing the recovery logic 310 may check one or more CPUs and/or other components for synchronization purposes to confirm that they have finished collecting their crash dump data. For example, in some embodiments, each CPU 330 may place signature data in the common memory 332 to indicate is has complete its crash data collection.

At operation 409, a management processor implementing the recovery logic 310 may reset the NAND module 308, for example, to ensure that it may properly store the crash dump data. The management processor may also reset the HI 328 at operation 409. In some embodiments, resetting of the FTL 328 by the management processor may cause the FTL 328 to reset the NAND module 308.

At operation 410, a management processor implementing the recovery logic 310 may restart one or more of the CPUs 330. In some embodiments, the CPUs 330 may be partially restarted to less than a full restart level. For example, one or more of the CPUs 330 may be restarted to a minimal level by initializing just enough CPU data structures to enable the CPUs 330 to save the crash dump data, which may temporarily stored in the common memory 332, to nonvolatile memory such as the NAND module 308. Thus, data structures used by the CPUs 330 for normal operation such as communicating with the host may be left uninitialized.

At operation 411, a management processor implementing the recovery logic 310 may initiate a transfer of some or all of the crash dump data from the common memory 332 to nonvolatile memory such as the NAND module 308.

At operation 412, a management processor implementing the recovery logic 310 may initiate a full or partial restart on one or more components of the storage device 300. For example, any of the functionality in storage device controller 306 including the one or more CPUs 330 may be fully restarted with data structures initialized to the extent of a normal power up restart. In some implementations, this may include reloading some or all of the firmware for one or more of the CPUs 330, for example, because code corruption of the firmware may have been a cause of the crash. In some implementations, restarting one or more components of the storage device 300 may clean up one or more pending administrative and/or I/O commands from the host 314.

At operation 413, a controller fatal error condition may be communicated to the host 314, for example, by asserting a bit in a controller register space. In some embodiments, a controller fatal error condition may be communicated for more than one of the controllers, for example, for each of the controllers 320, 322, 324, and/or 326. The host 314 may then read the status of a corresponding bit in the controller register space for one or more of the controllers, thereby determining that a fatal error has occurred in the storage device 300. In some embodiments, reading the controller fatal error condition may prompt the host to issue a controller reset for one or more of the controllers.

At operation 414, the storage device 300 may wait for the host 314 to issue a controller reset for one or more of the controllers 320, 322, 324, and/or 326.

At operation 415, the host 314 may issue a controller reset for one or more of the controllers, for example, for each of the controllers 320, 322, 324, and/or 326. In some embodiments, a controller reset may be implemented, for example, as a reset event from the host 314. In some embodiments, a reset event may be implemented, for example, with a reset command from the host 314.

At operation 416, in response to receiving a controller reset for one or more of the controllers, the storage device 300 may reset the NVMe interface 304. In some embodiments, the PCIe interface 302 may continue to operate, thereby preserving the connection with the host 314. At this point, a management processor implementing the recovery logic 310 may instruct one or more of the controllers 320, 322, 324, and/or 326 to clear the configuration information from the host, which may be stored, for example, in one or more configuration registers in SRAM in the NVMe interface 304. In some embodiments, resetting the NVMe interface 304 may clean up one or more commands which may be pending, for example, in an NVMe layer of hardware and/or software.

In some embodiments, while resetting one or more controllers, the host may issue one or more controller status register reads to determine the status of the one or more controller resets. Controller status register access may be blocked during this period in which the NVMe interface 304 may be reset. In some embodiments, the NVMe interface 304 reset may be completed in an amount of time to avoid a PCIe completion timeout on the host side. For example, there may be a minimum timeout duration that a host may designate for detecting a timeout condition. Thus, in some embodiments, the recovery operation and/or the NVMe interface reset may be implemented to be completed in an amount of time that is less than or equal to the minimum timeout duration.

At operation 417, a management processor implementing the recovery logic 310 may instruct one or more controllers in the PCIe interface 302 and/or the NVMe interface 304 to unmask events that were masked at operation 406. In some embodiments, any events that occurred while events where masked may be executed after events are unmasked.

At operation 418, the storage device 300 may resume fetching, processing, and/or arbitrating commands from the host 314.

At operation 419, the crash recovery process may be considered complete and the watchdog logic 312 may resume monitoring for a crash event. In some embodiments, the host may be notified that the reset of one or more of the controllers 320, 322, 324, and/or 326 is complete, for example, by asserting a bit in a corresponding controller register space.

The operations and/or components described with respect to the embodiment illustrated in FIGS. 3 and 4, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

Figure 5:
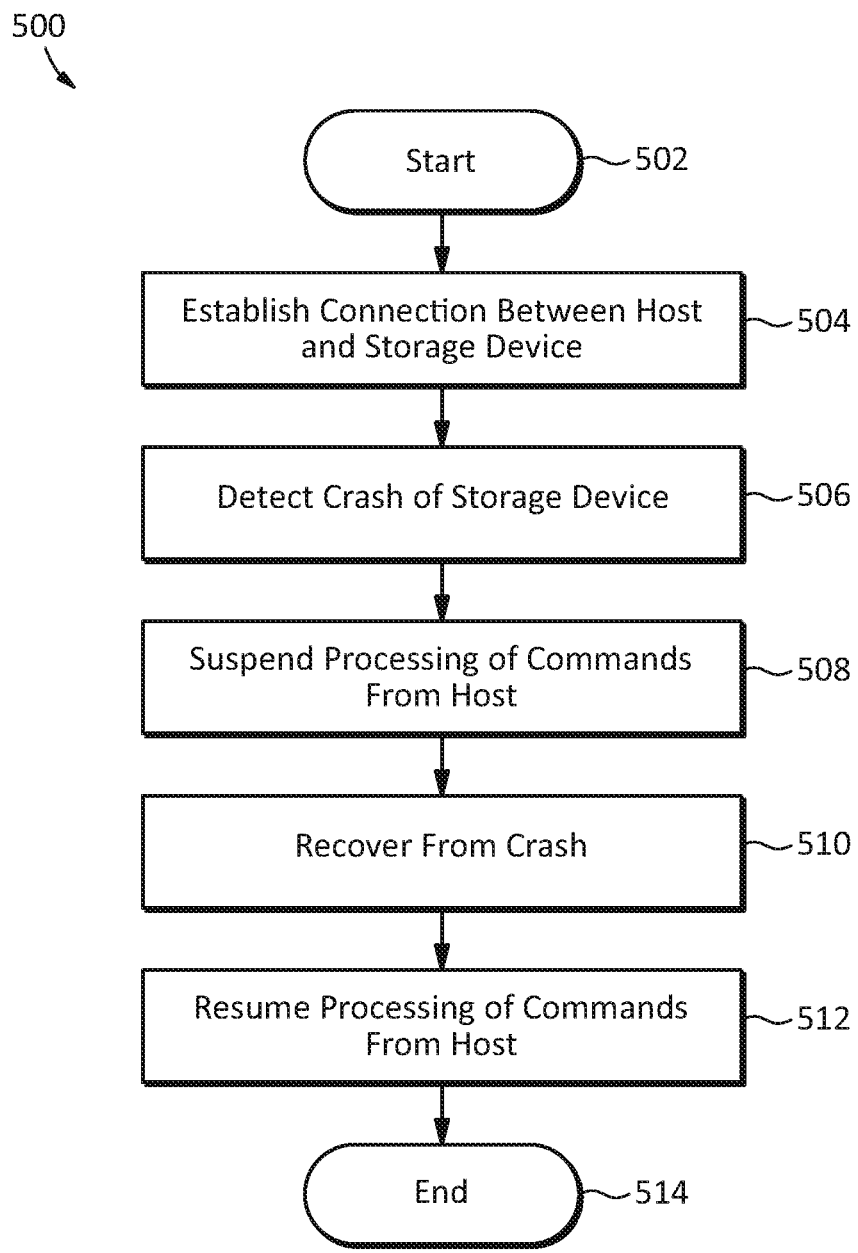
FIG. 5 illustrates an embodiment of a method for recovering from a crash of a storage device according to this disclosure.

FIG. 5 illustrates an embodiment of a method for operating a storage device according to this disclosure. The method illustrated in FIG. 5 may be used, for example, with the systems illustrated in FIG. 1 or 3, but the method is not limited to the details of any particular system. The method 500 may start at operation 502. At operation 504, the method may establish a connection (e.g., through communication interface 102 or 302) between a host (e.g., 114 or 314) and a storage device (e.g., 100 or 300). At operation 506, the method may detect a crash of the storage device (e.g., 100 or 300). At operation 508, the method may suspend, based on detecting the crash, processing commands from the host (e.g., 114 or 314) through the connection (e.g., 102 or 302). At operation 510, the method may recover from the crash of the storage device. At operation 512, the method may resume, based on recovering from the crash, processing commands from the host (e.g., 114 or 314) through the connection (e.g., 102 or 302). The method may end at operation 514.

Figure 6:
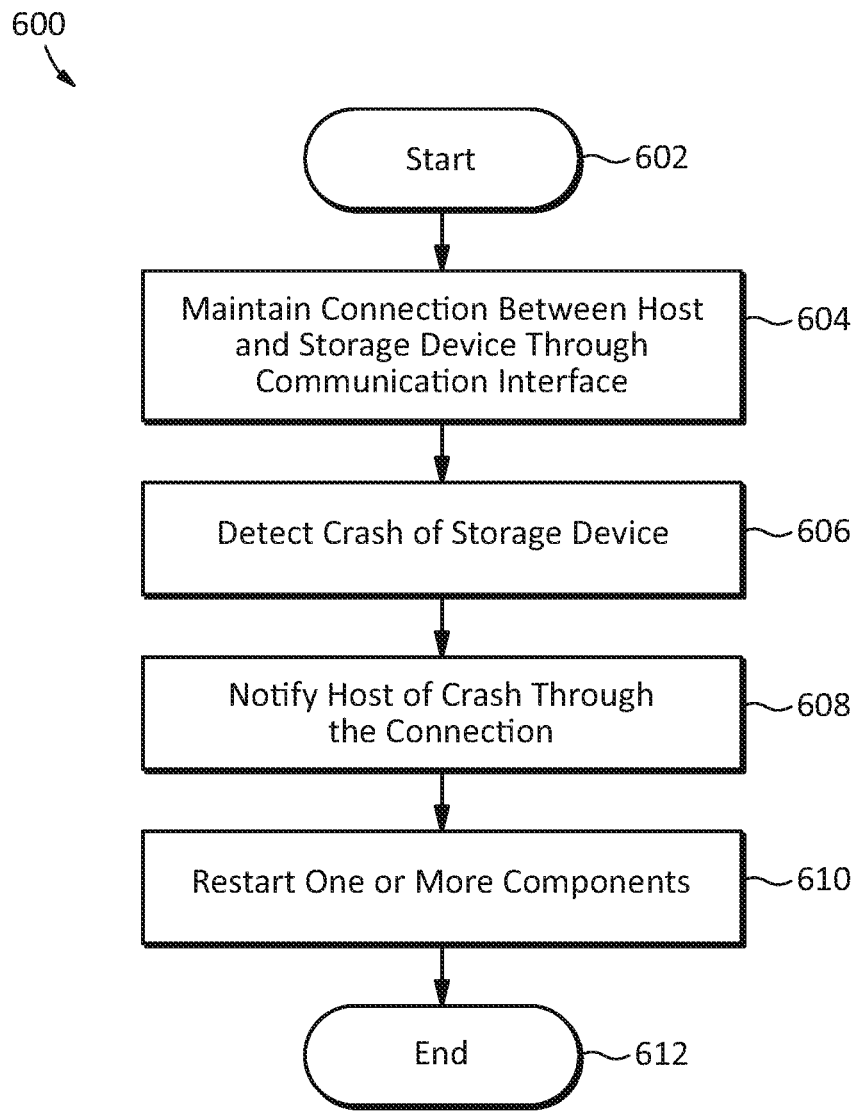
FIG. 6 illustrates another embodiment of a method for recovering from a crash of a storage device according to this disclosure.

FIG. 6 illustrates an embodiment of a method for recovering from a crash of a storage device according to this disclosure. The method illustrated in FIG. 6 may be used, for example, with the systems illustrated in FIG. 1 or 3, but the method is not limited to the details of any particular system. The method 600 may start at operation 602. At operation 604, the method may maintain a connection between a storage device e.g., 100 or 300) and a host e.g., 114 or 314) through a communication interface (e.g., 102 or 302). At operation 606, the method may detect a crash at the storage device (e.g., 100 or 300). At operation 608, the method may notify the host (e.g., 114 or 314) of the crash through the connection (e.g., 102 or 302). At operation 610, the method may restart one or more components of the storage device (e.g., 100 or 300) based on detecting the crash. The method may end at operation 612.

The operations and/or components described with respect to the embodiment illustrated in FIGS. 5 and 6, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

The embodiments disclosed above have been described in the context of various implementation details, but the principles of this disclosure are not limited these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not to indicate any spatial or temporal order unless apparent otherwise from context. In some embodiments, based on" may refer to "based at least in part on." In some embodiments, "disabled" may refer to "disabled at least in part." A reference to a first thing may not imply the existence of a second thing.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method of operating a storage device comprising:
   establishing a connection between a host and the storage device;
   detecting a crash of the storage device;

suspending, based on detecting the crash, processing commands, via a processor of the storage device, from the host through the connection;
recovering from the crash of the storage device, wherein recovering from the crash of the storage device includes:
   masking an event of a first type;
   initiating a first reset operation of the processor of the storage device;
   transferring, by the processor of the storage device, data from a first medium of the storage device to a second medium of the storage device; and
   initiating a second reset operation of the processor of the storage device; and
resuming, based on recovering from the crash, processing commands from the host through the connection, including executing the masked event of a first type.

2. The method of claim 1, further comprising notifying the host of the crash based on detecting the crash of the storage device.

3. The method of claim 2, wherein notifying the host comprises sending an asynchronous event notification to the host through the connection.

4. The method of claim 2, wherein notifying the host comprises asserting a controller status indicator.

5. The method of claim 2, further comprising:
receiving a third reset operation from the host; and
resetting a storage interface based on receiving the third reset operation from the host.

6. The method of claim 5, wherein:
the third reset operation comprises a controller reset; and
resetting the storage interface comprises resetting a controller in the storage interface.

7. The method of claim 1, further comprising maintaining the connection through a communication interface.

8. The method of claim 7, wherein recovering from the crash comprises enabling a host reset of the communication interface.

9. The method of claim 1, wherein recovering from the crash of the storage device further comprises partially restarting the processor of the storage device and storing crash dump data using the partially restarted processor of the storage device.

10. The method of claim 9, wherein recovering from the crash of the storage device further comprises:
resetting a storage media module; and
storing the crash dump data in the storage media module.

11. The method of claim 1, wherein recovering from the crash of the storage device further includes processing an event of a second type at a storage interface.

12. The method of claim 11, wherein the event of the second type is associated with maintaining the connection.

13. The method of claim 12, wherein the event of the second type is one of a port-level reset, a function-level reset, a control transaction, or a memory transaction.

14. A storage device comprising:
a storage media module;
a communication interface arranged to provide a connection between the storage device and a host; and
recovery logic configured to:
perform a crash recovery process based on detecting a crash of the storage device;
maintain the connection based on the crash recovery process, wherein the crash recovery process includes:
   masking an event of a first type;
   initiating a first reset operation of a processor of the storage device;
   transferring, by the processor of the storage device, data from a first medium of the storage device to a second medium of the storage device; and
   initiating a second reset operation of the processor of the storage device; and
resume, based on recovering from the crash, via the processor of the storage device, processing commands from the host through the connection, including executing the masked event of a first type.

15. The storage device of claim 14, further comprising a storage interface coupled between the communication interface and the storage media module.

16. The storage device of claim 15, wherein the storage interface is configured to reset based on a reset event from the host.

17. The storage device of claim 14, wherein the recovery logic is further configured to notify the host of the crash of the storage device.

18. A method comprising:
maintaining a connection between a storage device and a host through a communication interface;
detecting a crash at the storage device;
notifying the host of the crash through the connection; and
recovering from the crash of the storage device, including:
   masking an event of a first type, based on detecting the crash;
   initiating a first reset operation of a processor of the storage device;
   transferring, by the processor of the storage device, data from a first medium of the storage device to a second medium of the storage device; and
   initiating a second reset operation of the processor of the storage device; and
resuming, based on recovering from the crash, via the processor of the storage device, processing commands from the host through the connection, including executing the masked event of a first type.

19. The method of claim 18, the recovering from the crash of the storage device further comprising:
partially restarting the processor of the storage device; and
saving crash dump data using the processor of the storage device.

* * * * *